(12) United States Patent
Jarvis et al.

(10) Patent No.: US 8,731,618 B2
(45) Date of Patent: May 20, 2014

(54) PORTABLE ELECTRONIC DEVICE

(75) Inventors: Daniel W. Jarvis, Sunnyvale, CA (US); Adam D. Mittleman, San Francisco, CA (US); Ming Xu, Cupertino, CA (US); Ching Yu John Tam, Los Gatos, CA (US)

(73) Assignee: Apple Inc., Cupertino, CA (US)

( * ) Notice: Subject to any disclaimer, the term of this patent is extended or adjusted under 35 U.S.C. 154(b) by 898 days.

(21) Appl. No.: 12/429,157

(22) Filed: Apr. 23, 2009

(65) Prior Publication Data

US 2010/0273530 A1 Oct. 28, 2010

(51) Int. Cl.
*H04M 1/00* (2006.01)
*G01J 1/00* (2006.01)
*G06F 3/041* (2006.01)
*F16F 1/20* (2006.01)

(52) U.S. Cl.
USPC ............ 455/566; 356/213; 345/173; 267/164

(58) Field of Classification Search
USPC ............ 455/566; 356/213; 345/173; 267/164
See application file for complete search history.

(56) References Cited

U.S. PATENT DOCUMENTS

| | | | | |
|---|---|---|---|---|
| 5,726,443 | A * | 3/1998 | Immega et al. ............ | 250/227.2 |
| 6,087,653 | A * | 7/2000 | Van Schyndel et al. . | 250/227.11 |
| 6,214,631 | B1 * | 4/2001 | Burrows et al. ................. | 438/22 |
| 6,932,187 | B2 * | 8/2005 | Banter et al. .................. | 181/149 |
| 2006/0197753 | A1 * | 9/2006 | Hotelling ...................... | 345/173 |
| 2007/0069751 | A1 * | 3/2007 | Hantschel et al. ............ | 324/762 |
| 2007/0075968 | A1 * | 4/2007 | Hall et al. ...................... | 345/157 |
| 2007/0091062 | A1 * | 4/2007 | French et al. .................. | 345/107 |
| 2007/0291015 | A1 * | 12/2007 | Mori .............................. | 345/173 |
| 2008/0006762 | A1 * | 1/2008 | Fadell et al. ................ | 250/201.1 |
| 2008/0158173 | A1 * | 7/2008 | Hamblin et al. ............... | 345/173 |
| 2008/0273205 | A1 * | 11/2008 | Lee et al. ....................... | 356/440 |
| 2009/0046072 | A1 * | 2/2009 | Emig et al. ..................... | 345/173 |
| 2010/0008030 | A1 * | 1/2010 | Weber et al. ............. | 361/679.02 |
| 2010/0188443 | A1 * | 7/2010 | Lewis et al. ................... | 345/691 |
| 2010/0208245 | A1 * | 8/2010 | Leviton ..................... | 356/139.02 |

FOREIGN PATENT DOCUMENTS

CN 201194254 Y 2/2009

OTHER PUBLICATIONS

Dinh et al., U.S. Appl. No. 12/242,909, filed Sep. 30, 2008.

* cited by examiner

*Primary Examiner* — Timothy Pham
(74) *Attorney, Agent, or Firm* — Treyz Law Group; David C. Kellogg

(57) ABSTRACT

Portable electronic devices are provided. A device may include cover glass with a light mask. The light mask may be microperforated to allow light to pass through the light mask. The microperforations may allow light to pass through the light mask. The devices may include sensors and light emitters that receive and transmit light through the microperforations. The devices may include a variable cantilever spring as part of a button assembly. The spring may be flattened against itself without exceeding its elastic limit. The devices may include display modules. The display module may include structures that block light from leaking out of the module. The structures may include opaque tapes, opaque enclosures for the display module, and other suitable structures.

23 Claims, 19 Drawing Sheets

PORTABLE ELECTRONIC DEVICE

BACKGROUND

This relates generally to electronic devices and, more particularly, to portable electronic devices.

Electronic devices such as portable electronic devices are becoming increasingly popular. Examples of portable devices include handheld computers, cellular telephones, media players, and hybrid devices that include the functionality of multiple devices of this type. Popular portable electronic devices that are somewhat larger than traditional handheld electronic devices include laptop computers and tablet computers.

An electronic device may include one or more sensors. The sensors may be used to sense information about the environment around the electronic device such an ambient light level and the proximity of nearby objects. The electronic device may include one or more apertures that pass radiation between the sensors and the external environment. The apertures may not be aesthetically pleasing and may divert attention away from other aesthetically pleasing features of the electronic device. It would therefore be desirable to provide electronic devices that have improved sensor apertures.

An electronic device may include a housing and a display module mounted in the housing. The display module may emit light through a display opening in the housing. With conventional display modules, light may also escape into the housing from the sides and rear of the display module. The light that escapes into the housing can then escape through cracks or joints in the housing which is aesthetically undesirable. It would therefore be desirable to provide display modules for electronic devices that minimize light leakage.

Electronic devices may sometimes include a compression spring as part of a button mechanism. Conventional button springs can become deformed and non-functional if they are fully compressed. It would therefore be desirable to provide springs for button mechanisms in an electronic device that can be more fully compressed without deforming.

SUMMARY

Portable electronic devices are provided. The electronic devices may be hybrid devices that combine the functionality of multiple devices. An example of a hybrid electronic device is a cellular telephone that includes media player functionality.

An electronic device may include a display and a transparent cover that covers the display. The transparent cover may be formed from cover glass and may extend beyond the borders of the display and, if desired, may cover a majority of one or more sides of the electronic device. For example, the cover glass may extend almost entirely across the front face of the electronic device. With one suitable arrangement, the electronic device may include a mask behind or in front of portions of the cover glass to obscure internal components in the electronic device from view. Generally, the mask need not extend across the display. However, if desired, the mask may overlap the edges of the display. The cover glass and mask may have portions defining holes. As an example, the holes may include a hole for a button mechanism (e.g., a menu button hole) and a hole for a speaker (e.g., a port for transmitting sound through the cover glass).

A mask for cover glass in an electronic device may include microperforations. The microperforations may allow light and other radiation to pass through the mask and cover glass. With this type of arrangement, the electronic device may include sensors underneath the cover glass that can transmit and receive radiation through the cover glass. The microperforated mask may allow radiation to pass through the mask while simultaneously obscuring the sensors from a user's view. In general, the electronic device may include any desired type of sensor such as a proximity sensor, an ambient light sensor, an orientation sensor, etc. With one suitable arrangement, the mask may be formed from a relatively thin layer of deposited material and, as an example, the microperforations may be formed using a laser to selectively etch away portions of the mask.

An electronic device may include a display with structures that reduce light leakage from the display. The display, which is sometimes referred to as a display module, may include a plurality of layers held together in a chassis. As an example, the display may include structures that reduce light leakage from the display such as one or more strips of opaque tape. Strips of opaque tape may be applied to the exterior surface of the display module (e.g., to the exterior surface of a chassis for the display) to reduce light leakage from the display (e.g., to reduce the amount of light that escapes into the interior of the electronic device). If desired, strips of opaque tape may be placed in the interior of the display module (e.g., applied to an interior surface of the chassis) to reduce light leakage from the display.

An electronic device may include one or more compression springs. The compression springs may be a part of a button mechanism in the electronic device, as an example. With one suitable arrangement, a compression spring may be formed with a curved cantilever shape so that the spring does not plastically deform even if the spring is completely compressed. With another suitable arrangement, a compression spring may be formed with a variable cantilever shape and may incorporate a self-strengthening tip portion that increases the uncompressed height of the spring following a complete compression of the spring.

Further features of the invention, its nature and various advantages will be more apparent from the accompanying drawings and the following detailed description of the preferred embodiments.

DETAILED DESCRIPTION

The present invention relates to electronic devices and components in electronic devices. The electronic devices may be portable electronic devices such as laptop computers or small portable computers of the type that are sometimes referred to as ultraportables. Portable electronic devices may also be somewhat smaller devices. Examples of smaller portable electronic devices include wrist-watch devices, pendant devices, headphone and earpiece devices, and other wearable and miniature devices.

With one suitable arrangement, the portable electronic devices may be wireless electronic devices. The wireless electronic devices may be, for example, handheld wireless devices such as cellular telephones, media players with wireless communications capabilities, handheld computers (also sometimes called personal digital assistants), global positioning system (GPS) devices, and handheld gaming devices. The wireless electronic devices may also be hybrid devices that combine the functionality of multiple conventional devices. Examples of hybrid portable electronic devices include a cellular telephone that includes media player functionality, a gaming device that includes a wireless communications capability, a cellular telephone that includes game and email functions, and a portable device that receives email, supports mobile telephone calls, has media player functionality, and supports web browsing. These are merely illustrative examples.

Figure 1:
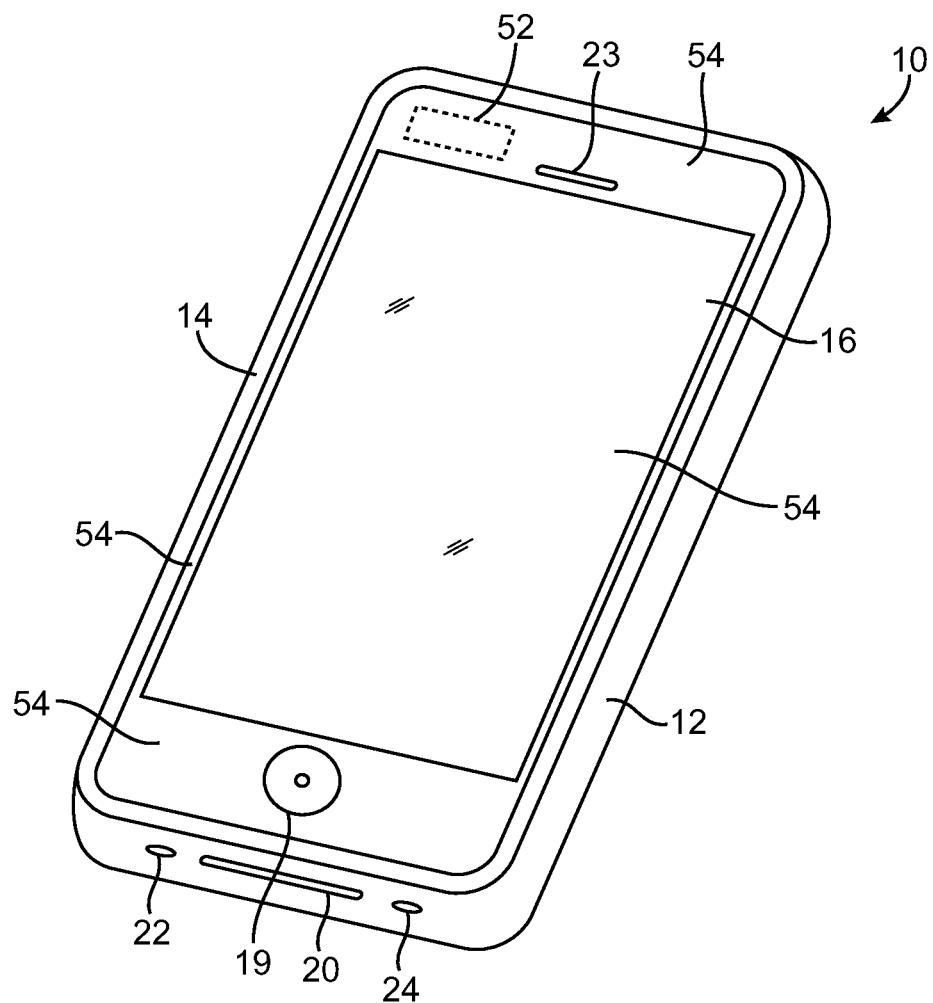
FIG. 1 is a perspective view of an illustrative portable electronic device in accordance with an embodiment of the present invention.

An illustrative electronic device in accordance with an embodiment of the present invention is shown in FIG. 1. User device 10 may be any suitable electronic device such as a portable or handheld electronic device. Device 10 of FIG. 1 may be, for example, a handheld electronic device that supports 2G and/or 3G cellular telephone and data functions, global positioning system capabilities or other satellite navigation capabilities, and local wireless communications capabilities (e.g., IEEE 802.11 and Bluetooth®) and that supports handheld computing device functions such as internet browsing, email and calendar functions, games, media player functionality, etc.

Device 10 may have housing 12 and display 16. Housing 12, which is sometimes referred to as a case, may be formed from any suitable material including, plastic, glass, ceramics, metal, or other suitable materials, or a combination of these and other materials.

Display 16 may be a liquid crystal display (LCD), a thin film transistor liquid crystal display (TFT-LCD), an organic light-emitting diode (OLED) display, or any other suitable display. The outermost surface of display 16 may be formed from one or more plastic or glass layers. If desired, touch screen functionality may be integrated into display 16 or may be provided using a separate touch pad device. With one suitable arrangement, display 16 may include structures that reduce light leakage from display 16 (e.g., structures that help to prevent light from escaping from display 16 to the interior of device 10).

Display screen 16 (e.g., a touch-screen) is merely one example of an input-output device that may be used with electronic device 10. If desired, electronic device 10 may have other input-output devices. For example, electronic device 10 may have user input control devices such as button 19, and input-output components such as port 20 and one or more input-output jacks (e.g., for audio and/or video). Button 19 may be, for example, a menu button. Port 20 may contain a 30-pin data and power connector (as an example). Openings 22 and 24 may, if desired, form speaker and microphone ports. Speaker port 22 may be used when operating device 10 in speakerphone mode. Opening 23 may also form a speaker port. For example, speaker port 23 may serve as a telephone receiver that is placed adjacent to a user's ear during operation. In the example of FIG. 1, display screen 16 is shown as being mounted on the front face of handheld electronic device 10, but display screen 16 may, if desired, be mounted on the rear face of handheld electronic device 10, on a side of device 10, on a flip-up portion of device 10 that is attached to a main body portion of device 10 by a hinge (for example), or using any other suitable mounting arrangement.

If desired, a button mechanism in device 10 such as button 19 may include a compression spring. The spring may be, as one example, a variable cantilever spring that can be fully compressed without permanently deforming (e.g., without undergoing plastic deformation).

A user of electronic device 10 may supply input commands using user input interface devices such as button 19 and touch screen 16. Suitable user input interface devices for electronic device 10 include buttons (e.g., alphanumeric keys, power on-off, power-on, power-off, and other specialized buttons, etc.), a touch pad, pointing stick, or other cursor control device, a microphone for supplying voice commands, or any other suitable interface for controlling device 10. Buttons such as button 19 and other user input interface devices may be formed on any suitable portion of device 10.

If desired, some or all of the input commands for device 10 may be received using accessories. This type of arrangement may help to reduce the size of the device 10 by reducing or even eliminating the number of control interfaces (e.g., buttons, sliders, etc.) located on the device 10. With one suitable arrangement, the device 10 may connect with a headset through a connector such as connector 20 or an audio connector (e.g., a tip, ring, and sleeve female audio connector) and may receive control commands such as play, pause, stop, fast forward, skip forward, rewind, skip back, volume up, volume down, mute, and other control commands from the headset. In this arrangement, a headset may include speakers and a control unit that generates command signals that can be interpreted by the device 10. If desired, device 10 can be controlled remotely (e.g., using an infrared remote control, a radio-frequency remote control such as a Bluetooth® remote control, etc.).

Device 10 may include cover 54. As shown in FIG. 1, cover 54 may extend over a majority of the front surface of device 10. Cover 54 may be formed from transparent glass or other suitable materials. Cover 54 may surround display 16 or may cover and surround display 16, if desired. As one example, cover 54 may be opaque and may obscure the internal components (except for display 16) mounted inside device 10. If desired, cover 54 may be somewhat or completely transparent so that a user can view the internal components mounted inside device 10. With one suitable arrangement, cover 54 may be formed from a transparent member such as glass coated on at least one side with an opaque material such as paint or ink. For example, cover 54 may be formed from a sheet of glass that covers the front surface of device 10 and from a layer of black paint on the underside of the sheet of glass. If desired, cover 54 (e.g., a sheet of glass) may extend over display 16 and the periphery of display 16 while the layer of black paint may extend over the periphery of display 16 but not over display 16. In general, cover 54 may include glass and one or more layers of paint or other structure in any suitable shade and pattern or combination thereof. Cover 54 may sometimes be referred to as cover glass. With one suitable arrangement, display 16 may have an active image area (e.g., the outlined portion of display 16 in FIG. 1) and an inactive peripheral region (e.g., the regions on the front face of device 10 beyond the outline portion of display 16 in FIG. 1). As one example, cover 54 may include an opaque layer that covers the inactive peripheral region of display 16. If desired, cover 54 and display 16 may be integrated together (e.g., cover 54 may be incorporated into display 16).

Device 10 may contain sensors for monitoring the environment around device 10. For example, device 10 may include sensors such as acoustic sensors, accelerometers, thermometers, altimeters and/or barometers, proximity sensors, ambient light sensors, etc. If desired, device 10 may include a proximity sensor that uses an emitter (e.g., an infrared LED or a radiation source that operates in another frequency) and a receiver or detector (e.g., an infrared receiver or a radiation detector that operates in another frequency) for detecting radiation. The proximity sensor may determine the distance to a nearby object by emitting radiation through the emitter and detecting radiation that has reflected off of the object, as an example. With one suitable arrangement, one or more sensors in device 10 may be located underneath cover 54. For example, as shown in FIG. 1 device 10 may include one or more sensors beneath cover 54 at the location of outline 52. In general, sensors in device 10 may be located at any suitable location (e.g., in the inactive peripheral region of display 16).

With one suitable arrangement, the portions of cover 54 above sensors in device 10 may be transparent or semi-transparent to radiation (i.e., visible and/or infrared light). As one example, cover 54 may be formed from transparent glass that has an opaque coating that does not extend over the sensors in device 10 and that has an infrared coating that does extend over the sensors. The infrared coating may have an appearance similar to the opaque coating in the visible spectrum (blocking visible light) but may be transparent to infrared radiation. With another suitable arrangement, the opaque coating over cover 54 may extend over some or all of the sensors in device 10 and may include a plurality of microperforations. For example, cover 54 may include a black mask (e.g., a black paint) with a plurality of microperforations. The microperforations in the black mask may be located between sensors in device 10 and the external environment such that radiation can pass between the sensors and the external environment. With one suitable arrangement, the opaque coating on cover 54 may be formed from a thin layer of metal deposited onto the glass of cover 54 using a physical vapor deposition process. The microperforations may be formed by etching away selected portions of the deposited metal layer using a laser, using photolithographic patterning techniques, etc.

Figure 2:
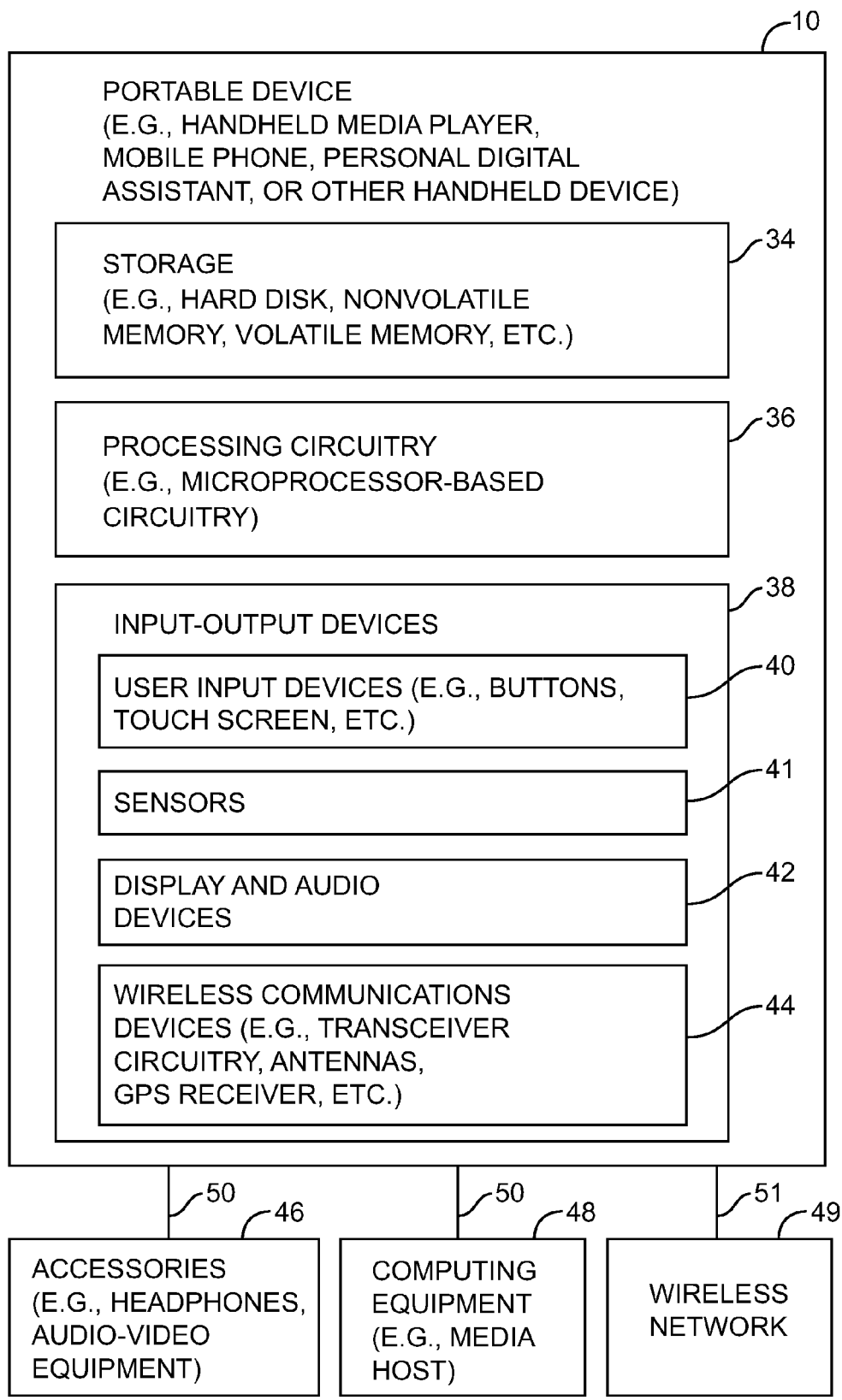
FIG. 2 is a schematic diagram of an illustrative portable electronic device in accordance with an embodiment of the present invention.

A schematic diagram of an embodiment of an illustrative portable electronic device such as a handheld electronic device is shown in FIG. 2. Portable device 10 may be a mobile telephone, a mobile telephone with media player capabilities, a handheld computer, a remote control, a game player, a global positioning system (GPS) device, a laptop computer, a tablet computer, an ultraportable computer, a hybrid device that includes the functionality of some or all of these devices, or any other suitable portable electronic device.

As shown in FIG. 2, device 10 may include storage 34. Storage 34 may include one or more different types of storage such as hard disk drive storage, nonvolatile memory (e.g., flash memory or other electrically-programmable-read-only memory), volatile memory (e.g., battery-based static or dynamic random-access-memory), etc.

Processing circuitry 36 may be used to control the operation of device 10. Processing circuitry 36 may be based on a processor such as a microprocessor and other suitable integrated circuits. With one suitable arrangement, processing circuitry 36 and storage 34 are used to run software on device 10, such as internet browsing applications, voice-over-internet-protocol (VOIP) telephone call applications, email applications, media playback applications, navigation functions, map functions, operating system functions, power management functions, etc.

Input-output devices 38 may be used to allow data to be supplied to device 10 and to allow data to be provided from device 10 to external devices. Display screen 16, button 19, microphone port 24, speaker port 22, and dock connector port 20 are examples of input-output devices 38. In general, input-output devices 38 may include any suitable components for receiving input and/or providing output from device 10. For example, input-output devices 38 can include user input-output devices 40 such as buttons, touch screens, cameras, joysticks, click wheels, scrolling wheels, touch pads, key pads, keyboards, microphones, etc. A user can control the operation of device 10 by supplying commands through user input devices 40.

Input-output device 38 may include sensors 41 such as proximity sensors, ambient light sensors, orientation sensors, proximity sensors, and any other suitable sensors.

Display and audio devices 42 may include liquid-crystal display (LCD) screens or other screens, light-emitting diodes (LEDs), and other components that present visual information and status data. Display and audio devices 42 may also include audio equipment such as speakers and other devices for creating sound. Display and audio devices 42 may contain audio-video interface equipment such as jacks and other connectors for external headphones and monitors.

Wireless communications devices 44 may include communications circuitry such as radio-frequency (RF) transceiver circuitry formed from one or more integrated circuits, power amplifier circuitry, passive RF components, antennas, and other circuitry for handling RF wireless signals. Wireless signals can also be sent using light (e.g., using infrared communications).

Device 10 can communicate with external devices such as accessories 46, computing equipment 48, and wireless network 49, as shown by paths 50 and 51. Paths 50 may include wired and wireless paths. Path 51 may be a wireless path. Accessories 46 may include headphones (e.g., a wireless cellular headset or audio headphones) and audio-video equipment (e.g., wireless speakers, a game controller, or other equipment that receives and plays audio and video content), a peripheral such as a wireless printer or camera, etc.

Computing equipment 48 may be any suitable computer. With one suitable arrangement, computing equipment 48 is a computer that has an associated wireless access point (router) or an internal or external wireless card that establishes a wireless connection with device 10. The computer may be a server (e.g., an internet server), a local area network computer with or without internet access, a user's own personal computer, a peer device (e.g., another portable electronic device 10), or any other suitable computing equipment.

Wireless network 49 may include any suitable network equipment, such as cellular telephone base stations, cellular towers, wireless data networks, computers associated with wireless networks, etc.

Figure 3:
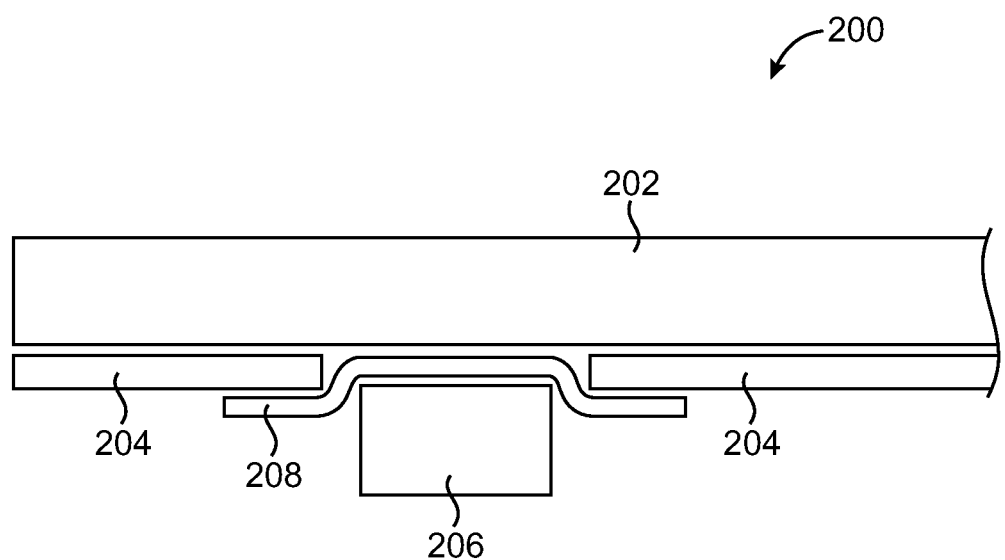
FIG. 3 is a cross-sectional side view of a conventional sensor mounted beneath a cover glass.

A conventional arrangement for mounting a sensor beneath cover glass in a cellular telephone is shown in FIG. 3. As shown in FIG. 3, cellular telephone 200 includes cover glass 202. Cover glass 202 includes black paint 204 that serves as an opaque backing to cover glass 202. Infrared light sensor 206 is located underneath the cover glass 202. Black paint 204 does not extend between sensor 206 and cover glass 202. Instead, infrared ink 208 is placed between sensor 206 and cover glass 202 to allow infrared radiation to pass between sensor 206 and the external environment. Typically, infrared ink 208 has an appearance that is similar to black paint 204 in the visible spectrum. Because convention infrared ink 208 has a nearly black appearance, it is difficult to maintain a uniform aesthetic appearance for conventional devices such as device 200 when the backing is not black in appearance.

In contrast, device 10 of FIG. 1 may incorporate a cover 54 that includes a backing that is not necessarily black in appearance. In general, the backing to cover 54 may be any suitable color and may include combinations of colors and/or patterns. With one suitable arrangement, the backing to cover 54 may have a silver color and may be metallic in appearance. In this example, the backing to cover 54 may be formed from using a physical vapor deposition process to deposit metallic material onto cover 54 (e.g., to deposit a thin metal layer onto cover glass 54). The backing to cover 54 may or may not be opaque. Opaque backings may be used to obscure internal components in device 10 from a user's view and transparent or semi-transparent backings may be used to showcase some or all of the internal components in device 10, if desired. In addition, because the backing to cover 54 may not rely upon infrared ink to obscure internal components such as sensors, the sensors in device 10 may be able to effectively transmit and receive radiation in the visible light spectrum.

Figure 4:
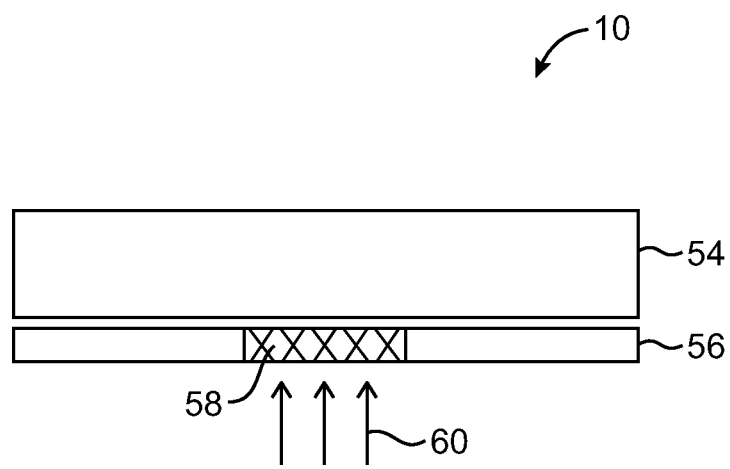
FIG. 4 is a cross-sectional side view of an illustrative cover glass in a portable electronic device that may have a light mask showing how the light mask may be perforated to allow light to pass through portions of the light mask in accordance with an embodiment of the present invention.

As shown in FIG. 4, device 10 may include an opaque backing 56 that extends substantially over an entire surface of cover 54. Backing layer 56 may include microperforations (e.g., relatively small holes) in region 58 in order to allow radiation (e.g., visible light and infrared light) to pass through the backing 56. With one suitable arrangement, cover 54 may be formed from transparent glass and backing 56 may be an opaque material such as paint, a metallic layer, ink, etc.

In general, microperforations may refer to relatively small holes that are substantially invisible while still transmitting a certain degree of light. The microperforations may be essentially invisible to a user but may allow enough light to pass through. As one example, when microperforations are formed in an opaque material, the microperforations may be invisible (e.g., the opaque material may have a relatively seamless appearance) unless a light source illuminates the microperforations (e.g., passes light through the microperforations) from the opposite side of the material. If desired, the microperforations may be filled with a transparent material such as a clear epoxy material. As one example, the microperforations may be formed with a tapered shape (e.g., the width of the microperforations may increase from a minimum width at the outer surface of backing 56 (e.g., the surface closest to the exterior environment) to a maximum width at the inner surface of backing 56 (e.g., the surface closest to the interior of device 10). Alternatively, the microperforations may have a relatively straight shape (e.g., a uniform diameter through backing 56). With one suitable arrangement, each of the microperforations in device 10 may have a diameter of approximately 30 micrometers and the pitch (center-to-center spacing) of the microperforations may be approximately 200 micrometers. If desired, the pitch of the microperforations may be less than 200 micrometers, greater than 200 micrometers, less than 500 micrometers, less than 1 millimeter, etc. As one example, the pitch of the microperforations may be in the range of 100 micrometers to 300 micrometers.

Figure 5:
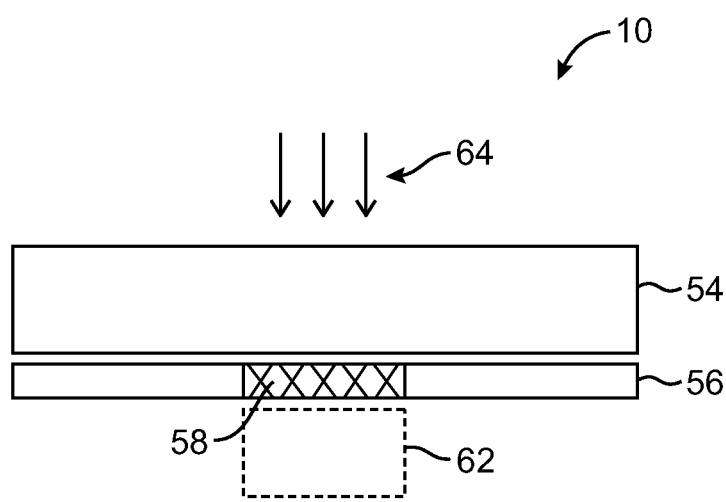
FIG. 5 is a cross-sectional side view of an illustrative sensor and cover glass with a light mask in a portable electronic device that shows how the light mask may be perforated to allow light to pass through the cover glass to the sensor in accordance with an embodiment of the present invention.

FIGS. 4 and 5 illustrate two ways in which the microperforations in region 58 of backing 56 may be formed. As one example, microperforations in region 58 of backing 56 may be formed by selectively removing portions of backing 56 using a laser cutting process. As shown in the FIG. 4 example, lasers may cut microperforations in region 58 of backing 56 by directing laser light along direction 60 towards backing 56. Alternatively, as shown in the FIG. 5 example, lasers may cut microperforations in region 58 of backing 56 by directing laser light along direction 64 through glass cover 54 towards backing 56. The microperforations may have, for example, a diameter in the range of 0.05 to 1.0 mm. If desired, the microperforations may have a diameter that is less than 0.05 mm.

As shown in FIG. 5, sensors such as sensor 62 may be mounted beneath cover glass 54 in device 10 (e.g., after the microperforations have been formed). In particular, sensor 62 may be mounted under cover glass 54 (e.g., a glass substrate) and region 58 of backing 56 (e.g., a microperforated region of backing 56). With this type of arrangement, radiation required for the operation of sensor 62 may pass through cover 54 and region 58 of backing 56. Sensor 62 may include one or more emitters and/or detectors that sense attributes of the environment around device 10. Sensors 62 may, for example, be an infrared light sensor or visible light sensor for making ambient light measurements.

Figure 6:
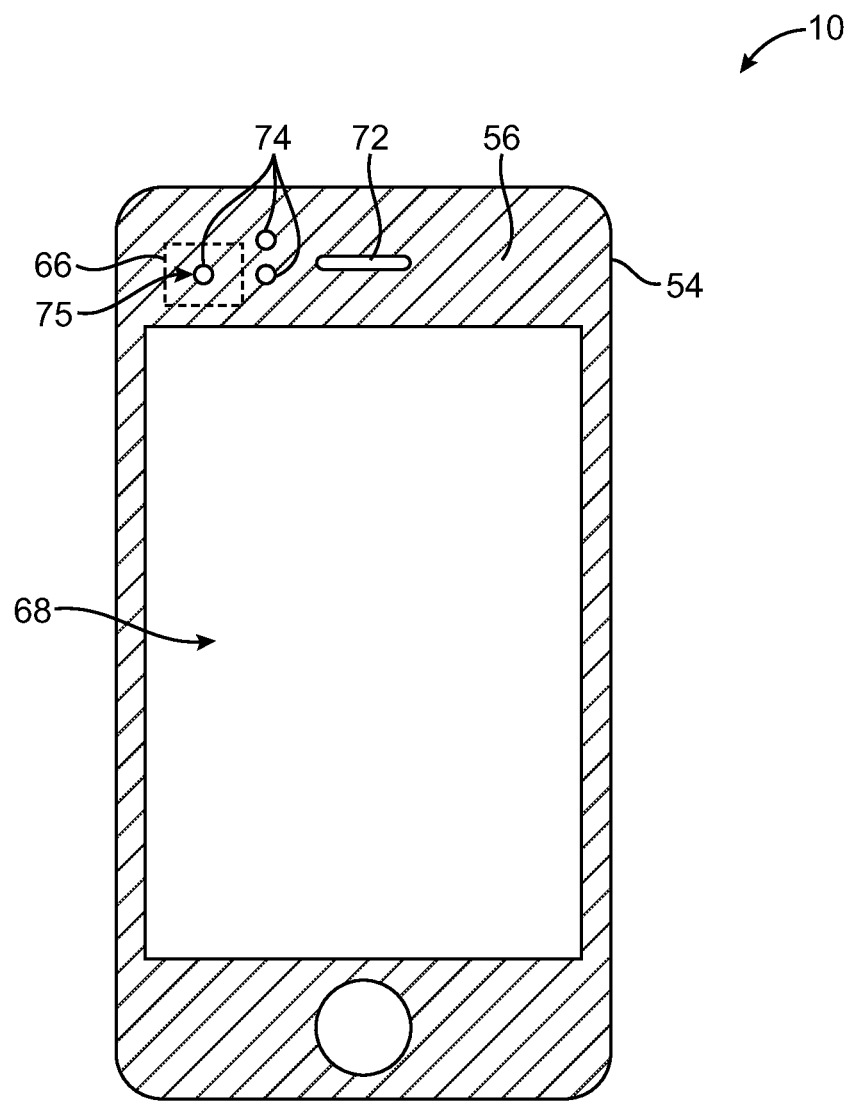
FIG. 6 is a front view of an illustrative cover glass with a light mask that may have microperforations to allow light to pass through the cover glass to one or more sensors that may be mounted beneath the cover glass in accordance with an embodiment of the present invention.

If desired, cover 54 may extend substantially across the entire front face of device 10 (e.g., the face shown in FIG. 1 which includes button 19, display 16, and port 23). This type of arrangement may create a smooth surface and may also enhance the aesthetic appearance of device 10. Backing 56 may also extend substantially over the front face of device 10. As shown in the example of FIG. 6, cover 54 may have holes in regions 70 and 72 and backing 56 may have holes in regions 68, 70, and 72. The holes in cover 54 and backing 56 may allow display 16 to emit light through cover 54, button 19 to be accessed by a user, and sound and radiation (light) to pass through cover 54 to port 23.

As shown in FIG. 6, device 10 may include sensors 74 (e.g., sensors 62). Sensors 74 may include an emitter and detector pair configured as a proximity sensor and an ambient light sensor, as an example. Sensors 74 may be mounted underneath cover 54 and backing 56. As described in connection with FIGS. 4 and 5, the backing 56 to cover 54 may have a plurality of small holes (microperforations) above each of the sensors 74 to allow radiation to pass between the sensors and the external environment.

With one suitable arrangement, microperforations in backing 56 of cover 54 may be optimized to maximize the performance of the sensors 74. With another suitable arrangement, the microperforations in backing 56 may be optimized to maximize the aesthetic appearance of device 10 (e.g., to minimize the visibility of the microperforations of a user of device 10). The microperforations in backing 56 may be designed to achieve a desired balance between sensor performance and aesthetic appearance. In general, sensor performance may be increased by increasing the number of microperforations, increasing the size of the microperforations, decreasing the distance between each microperforation, etc. In contrast, aesthetic appearance (e.g., the invisibility of the microperforations and underlying sensors) may generally be increased by decreasing the number of microperforations, decreasing the size of the microperforations, increasing the distance between each microperforation, etc.

If desired, one or more of the sensors 74 may include a camera. As an example, sensor 75 may be a camera. If desired, whole portions of backing 56 (rather than microperforations) may be removed above sensor 75. With one arrangement, the portion of backing 56 inside outline 66 may be removed. This type of arrangement may improve the performance of camera 75 by increasing the amount of light that reaches the camera 75.

Figure 7:
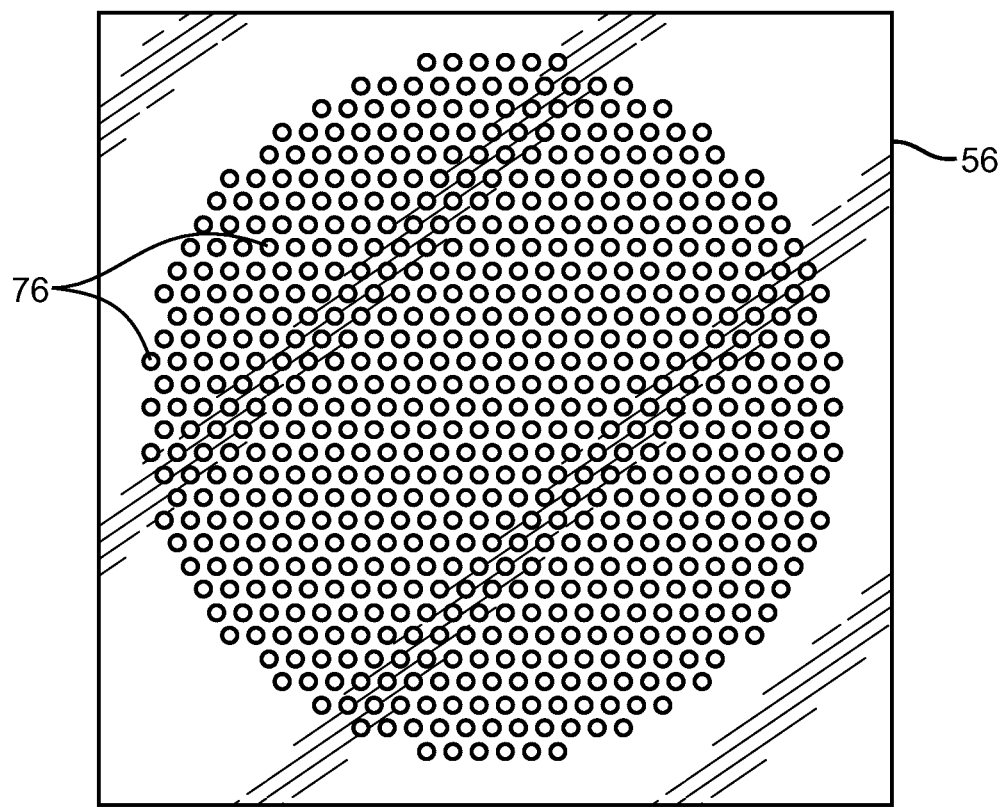
FIG. 7 is a front view of an illustrative light mask that may be perforated to allow light to pass through the light mask in accordance with an embodiment of the present invention.

A close-up of the microperforations in backing 56 (e.g., a light mask associated with cover 54) is shown in FIG. 7. As the example of FIG. 7 shows, backing 56 may include a plurality of relatively small perforations 76 (holes) in which the backing material (e.g., paint, metallic layer, etc.) has been removed. Each of the perforations 76 may be evenly spaced from other perforations 76 (e.g., the perforations 76 may be formed in a pattern or an array). As an example, the perforations 76 may have a diameter of approximately 75 microns. If desired, each of the perforations 76 may have a diameter that is more than 75 microns or a diameter that is less than 75 microns. In general, the perforations 76 may be formed in any suitable shape and may be arranged in any suitable manner (e.g., in an array, in a pattern, randomly, etc.). The perforations 76 may allow radiation to pass between sensors and the environment. The perforations 76 may be arranged in an array. With one suitable arrangement, the microperforations 76 may be formed by using a laser to remove the backing material at the location of each microperforation 76 (e.g., by starting with a complete backing layer and creating microperforations). Alternatively, microperforations 76 may be formed as the backing material is formed on cover 54. For example, backing 56 may be printed onto cover 54 (e.g., using screen printing techniques) and the microperforations 76 may be formed during the printing process (e.g., microperforations 76 may be formed by printing backing 56 onto cover 54 using a pattern that does not print backing material onto the microperforations 76).

As described in connection with FIG. 1, device 10 may include a display such as display 16 that is configured to minimize light leakage. An example of a display such as display 16 that includes structures to reduce light leakage is shown in FIG. 8.

Figure 8:
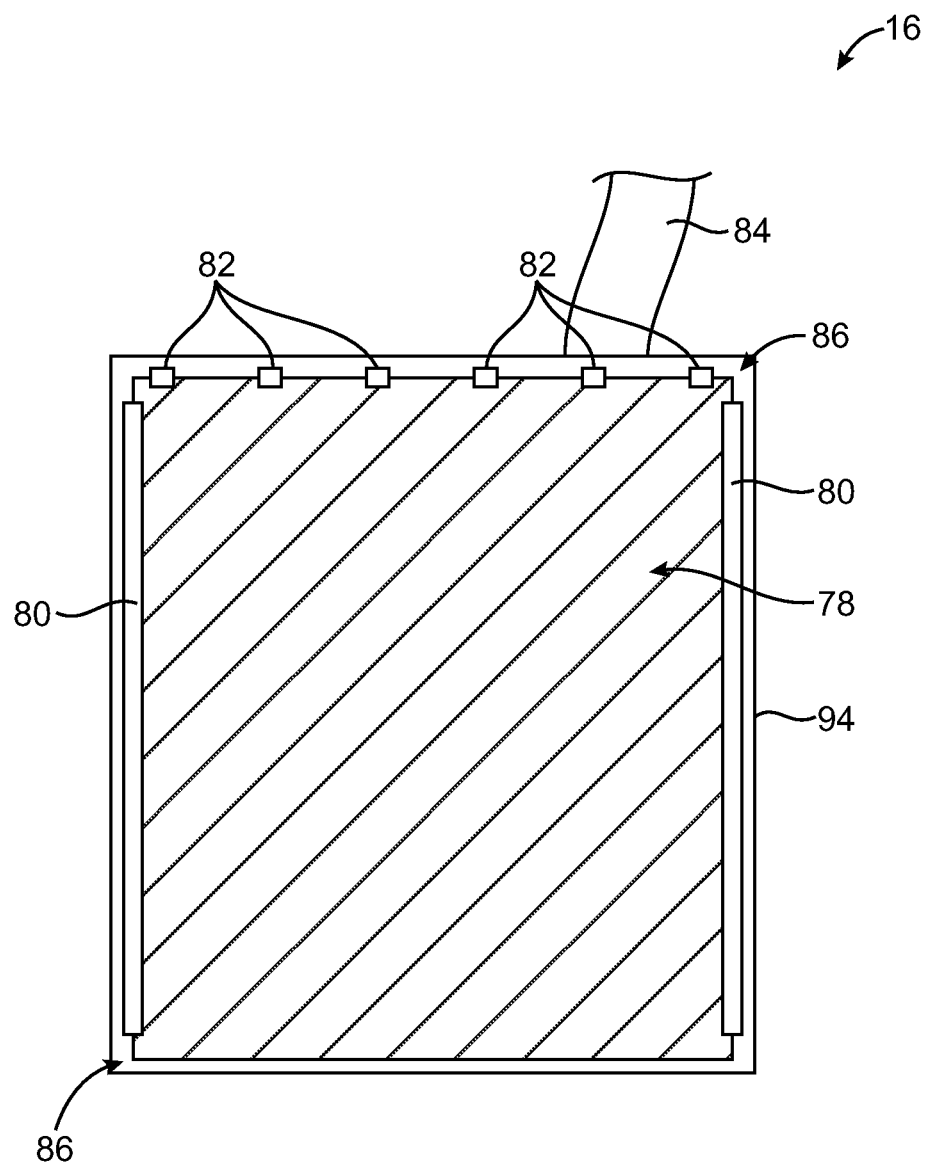
FIG. 8 is a rear view of an illustrative display module that may include structures to reduce light leakage from the display module in accordance with an embodiment of the present invention.

As shown in FIG. 8, display 16 may include one or more light sources such as light emitting diodes 82 (e.g., a back light for display 16). Light emitting diodes 82 may be arranged along a top edge of display 16 and the light from diodes 82 may be distributed throughout display 16 using a light guide. Each of the light emitting diodes 82 may be formed from a light emitting diode that produces white light. In general, display 16 may include any suitable light source such as a white light emitting diode (LED), a combination of red, blue, and green light emitting diodes, a cold cathode fluorescent lamp (CCFL), an incandescent light bulb, an electroluminescent panel (ELP), a hot cathode fluorescent lamp (HCFL), other suitable light sources, or a combination of these and other light sources.

Display 16 may include a connection interface 84. Connection interface 84 (e.g., a connector) may convey signals between display 16 and circuitry in device 10 such as processing circuitry 36 and video processing circuitry in device 10. Connection interface 84 may be based on any suitable type of interface. If desired, connection interface 84 may be formed from a flex circuit.

The back face of display 16 (e.g., the face of display 16 opposite the face that displays images for a user) may be substantially covered by a reflector 78. If desired, reflector 78 may be replaced with a planar backing structure rather than a reflecting structure. Reflector 78 may also be referred to as a planar backing structure. Reflector 78 may cover a light guide layer 86 in display 16, as one example. Layer 86 may be located substantially underneath reflector 78 in FIG. 8 and is therefore not shown separately in FIG. 8. Generally, reflector 78 helps to direct light towards the front face of display 16 and thereby increase the efficiency of display 16 by redirecting light that would otherwise escape through the back face of display 16. At the interface of reflector 78 and chassis 94 (e.g., a plastic support structure) or another portion of display 16, light may escape from display 16 (e.g., light may exit display 16 not through the desired display face or front face). This can lead to an unsightly condition in which light that has escaped from the rear face or sides of display 16 can enter the interior of device 10 and illuminate cracks or gaps in housing 12 of device 10.

Light leakage can be reduced by providing display 16 with opaque member 80. Opaque tape 80 may be, as an example, a double-sided tape (e.g., a tape with adhesive on two sides). Opaque tape 80 may help to reduce or eliminate light leakage from display 16 by limiting the amount of light that can escape from the gap between reflector panel 78, the underlying layers of display 16 such as light guide 86, and chassis 94, as an example. Tape 80 may cover the gap between panel 78 and chassis 94. With one suitable arrangement, tape 80 may be formed from a black tape. If desired, tape 80 may be formed from a tape which is white on the side placed against panel 78 and chassis 94 and that is black on the opposite side. As an example, tape 80 may be added to the interior of display 16 (e.g., tape 80 applied to an interior surface of chassis 94 and panel 78). With this type of arrangement, the light leakage from display 16 may be reduced without negatively affecting the white balance of display 16.

While tape 80 only extends across two of the edges of reflector 78 in the FIG. 8 example, in general tape 80 may be formed on any suitable portions of reflector 78. If desired, tape 80 may extend around the entire perimeter of reflector 78.

Figure 9:
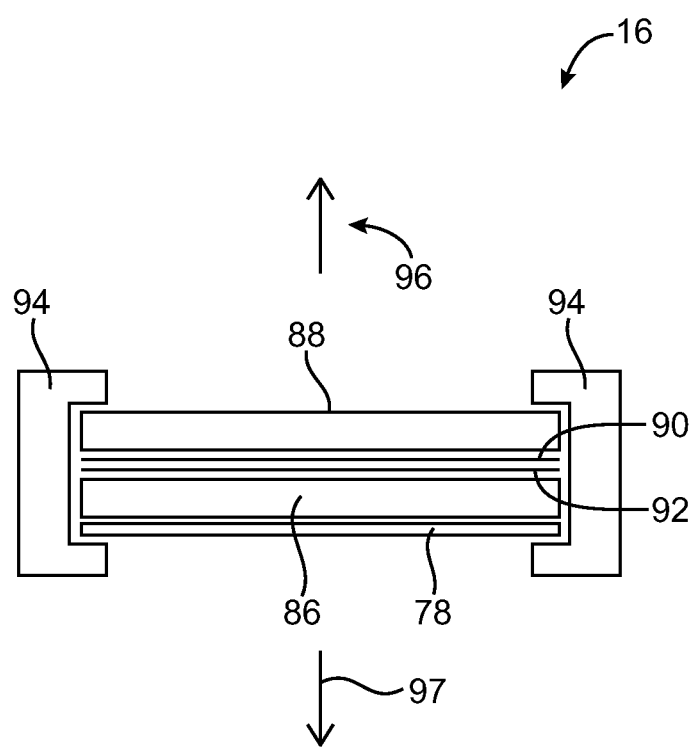
FIG. 9 is a cross-sectional end view of an illustrative display module that may include multiple layers and a chassis that holds the layers together in accordance with an embodiment of the present invention.

Display 16 may be formed from a plurality of layers held together in a chassis. For example, as shown in FIG. 9, display 16 may include a glass panel layer 88, a brightness enhancement film (BEF) 90, a diffuser film 92, light guide 86, and reflector 78. These layers may be sandwiched together and supported by chassis 94 (e.g., a plastic support structure). With one suitable arrangement, chassis 94 may be formed from a black material or may be formed from a material that is white on the inward facing sides of chassis 94 and that is black on the outward facing sides of chassis 94 (e.g., the exterior surface of chassis 94). This type of arrangement may help to reduce light leakage from display 16.

Light guide 86 may be coupled to light source 82 (shown in FIG. 8) of display 16. Light guide 86 may serve to evenly distribute the light from light source 82 across display 16.

As discussed in connection with FIG. 8, reflector 78 may redirect any light that is heading away from the desired direction for display 16. For example, it is desirable for light to be emitted by display 16 along direction 96. Reflector 78 may therefore redirect light that is headed in the direction 97 so that the redirected light is heading in the direction 96.

Diffuser film 92 may even out the light distributed by light guide 86. As an example, the light distributed by light guide 86 may be somewhat more intense (e.g., brighter) near light source 82 and somewhat less intense away from light source 82. Diffuser film 92 may help to counter the uneven intensity of light distributed by light guide 86 by diffusing light away from the higher intensity regions (near light source 82) towards the lower intensity regions (at the far end of display 16 opposite light source 82).

Brightness enhancement film 90 may enhance the brightness of display 16. With one suitable arrangement, film 90 may have a prismatic structure (or other suitable structure) and may refract light along direction 96, if the light hits the prismatic structure at a particular angle, and may reflect the rest of the light (e.g., via an total internal reflection) back towards reflector 78 (e.g., along direction 97). If desired, film 90 may be a multi-layer optical film. With another suitable arrangement, film 90 may be used to increase the brightness of display 16 by managing the polarization of light that enters glass panel 88. Because glass panel 88 may include one or more polarizers, managing the polarization of light using film 90 can increase the efficiency and brightness of display 16. With this type of arrangement, film 90 may selectively pass a light in a particular polarization to panel 88 (e.g., a polarization that may be aligned with a polarizer in panel 88) while reflecting other polarizations back towards reflector 86 (e.g., along direction 97). Because the light received by glass panel 88 is already in the correct polarization (in this example) less light may be absorbed by a polarizer in panel 88 and the overall amount of light emitted by display 16 along direction 96 may be increased.

Figure 10:
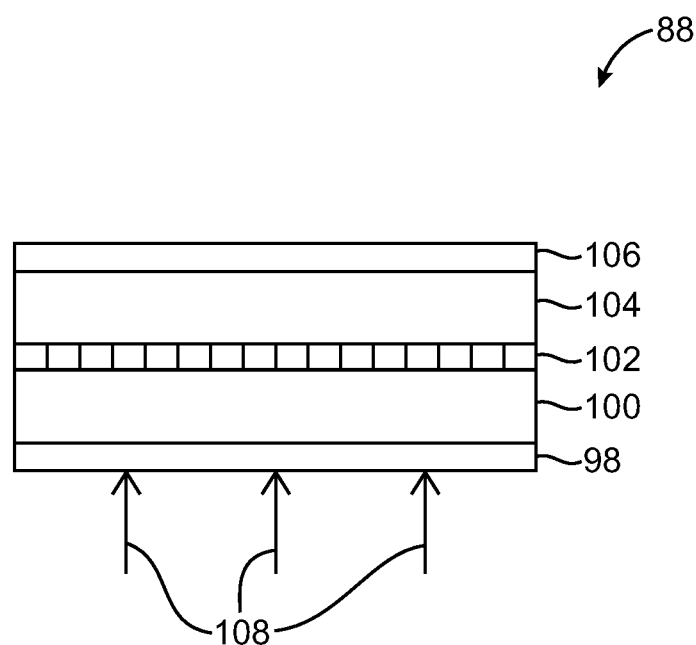
FIG. 10 is a cross-sectional side view of a glass panel layer that may be part of the illustrative display module of FIG. 9 in accordance with an embodiment of the present invention.

Glass panel 88 may include an LCD panel. A cross-sectional view of glass panel 88 is shown in FIG. 10. As an example, glass panel 88 may include bottom polarizer 98, array glass 100, thin film transistor and liquid crystal layer 102, color filter glass 104, and top polarizer 106.

With one suitable arrangement, light from light sources 82 may enter glass panel 88 along direction 108 and pass through polarizer 98. Polarizer 98 may ensure that the light entering glass panel 88 shares a common polarization.

After the light has passed through polarizer 98 and been polarized, the polarized light may pass through array glass 100. Array glass 100 may be a substrate layer on which thin-film-transistors may be formed. The polarized light may then pass through thin film transistor and liquid crystal layer 102. Layer 102 may include an array of liquid crystals each of which is controlled by a respective thin film transistor. As the polarized light passes through layer 102, the liquid crystals in layer 102 may be used to selectively alter the polarization of the light. The amount by which a given liquid crystal changes the polarization of light passing through it will typically depend on control signals received from the thin film transistor associated with the liquid crystal.

Color filter glass 104 may selectively filter the light received from layer 102 into an appropriate color. For example, each pixel in display 16 may be formed from three sub-pixels. Each sub-pixel may be formed from a single liquid crystal and may be used to produce one of the three primary colors red, blue, or green. Color filter glass 104 may then be used to filter the light coming from each sub-pixel into the appropriate primary color (e.g., filter glass 104 may be an array designed to turn the light from each red sub pixel into red light, the light from each blue sub pixel into blue light, and the light from each green sub pixel into green light).

Polarizer 106 may then filter the light before it leaves glass panel layer 88. With one arrangement, polarizer 106 may be configured to pass light with a polarization that is ninety degrees from the polarization of light from polarizer 98. With this arrangement, the amount to which liquid crystals in layer 102 change the polarization of light passing through layer 102 will determine the brightness of each individual pixel in display 16.

Figure 11:
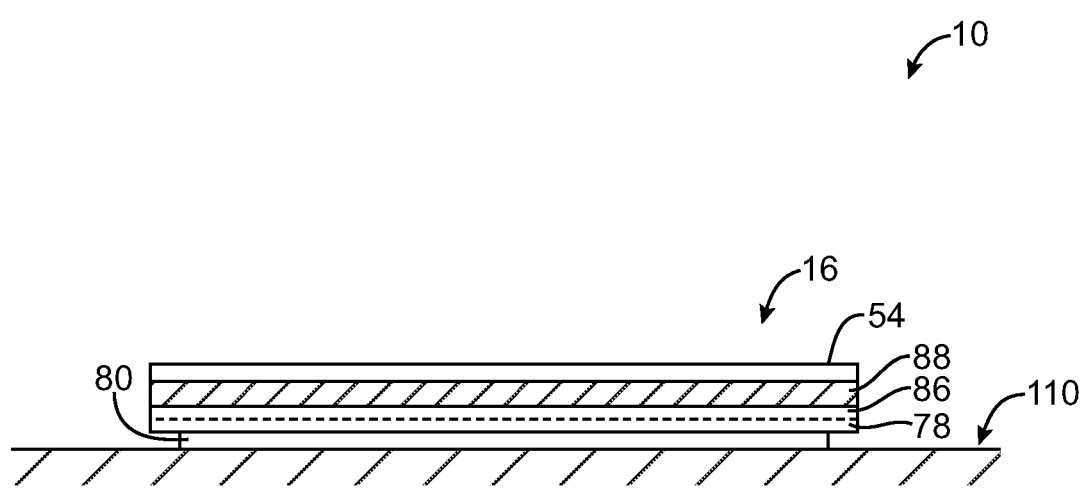
FIG. 11 is a cross-sectional side view of an illustrative display module that may be mounted to a mounting structure in an electronic device with double-sided tape in accordance with an embodiment of the present invention.

FIG. 11 illustrates how display 16 may be mounted to a mounting structure in device 10. As shown in FIG. 11, display 16 may be mounted to a mounting structure 110 in device 10 using tape 80. Tape 80 may be a double-side tape that also helps to prevent light leakage from display 16. With another suitable arrangement, display 16 may be mounted to mounting structure 110 using adhesive. Mounting structure 110 may be a portion of housing 12 or, if desired, may be a structure in device 10 sometimes referred to as a midplane (e.g., an internal metal structure in device 10 that can be used as a mounting point for various internal components such as display 16, storage devices, processing circuitry, etc.).

Figure 12:
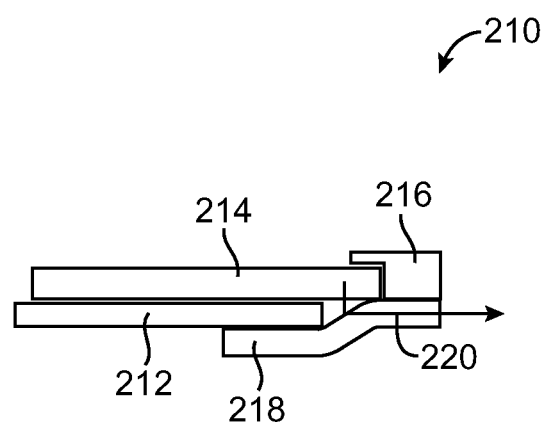
FIG. 12 is a side view of a conventional display module with clear tape that allows light to escape from the display module.

A conventional display module 210 is shown in FIG. 12. Display module 210 includes reflector 212, glass layer 214, chassis 216, and clear tape 218. Clear tape 218 serves to hold reflector 212 and layer 214 together and also holds reflector 212 and layer 214 to chassis 216. However, as shown in FIG. 12, light can escape from glass layer 214 and enter clear tape 218 as indicated by the arrow 220. Once light has entered clear tape 218, the light can leak from display module 210.

Figure 13:
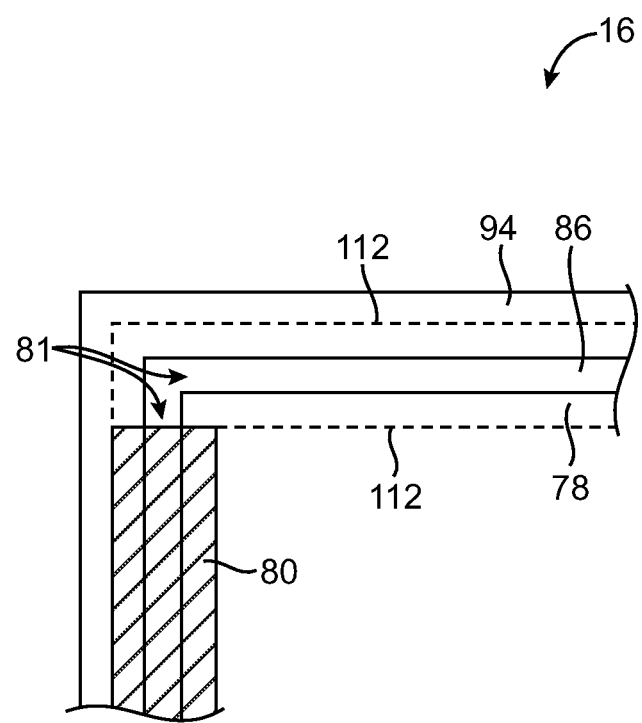
FIG. 13 is a rear view of an illustrative display module with opaque tape that helps to hold the layers of the display module together and that blocks errant light to prevent the light from escaping from the display module in accordance with an embodiment of the present invention.

In contrast, opaque tape 80 can help to reduce or eliminate leak leakage from display 16 of FIG. 1 by limiting the amount of light that can escape from display 16. A close up view of the rear of display 16 is shown in FIG. 13 which illustrates how opaque tape 80 helps to prevent light from escaping from display 16. As shown in FIG. 13, opaque tape 80 may overlap a gap 81 between reflector layer 78 and light guide 86. Tape 80 may also hold reflector layer 78 and light guide 86 to chassis 94, if desired. Because tape 80 is formed from an opaque material such as an opaque polymer, tape 80 will help to prevent light leakage from any gaps (e.g., gaps 81) between reflector 78 and light guide 86 in display 16.

If desired, tape 80 may be formed from a transparent material. With this type of arrangement, an opaque material may be applied to the exterior of tape 80 to reduce light leakage. For example, a black paint may be applied to the exterior of a clear version of tape 80 to effectively make tape 80 opaque.

Figure 14:
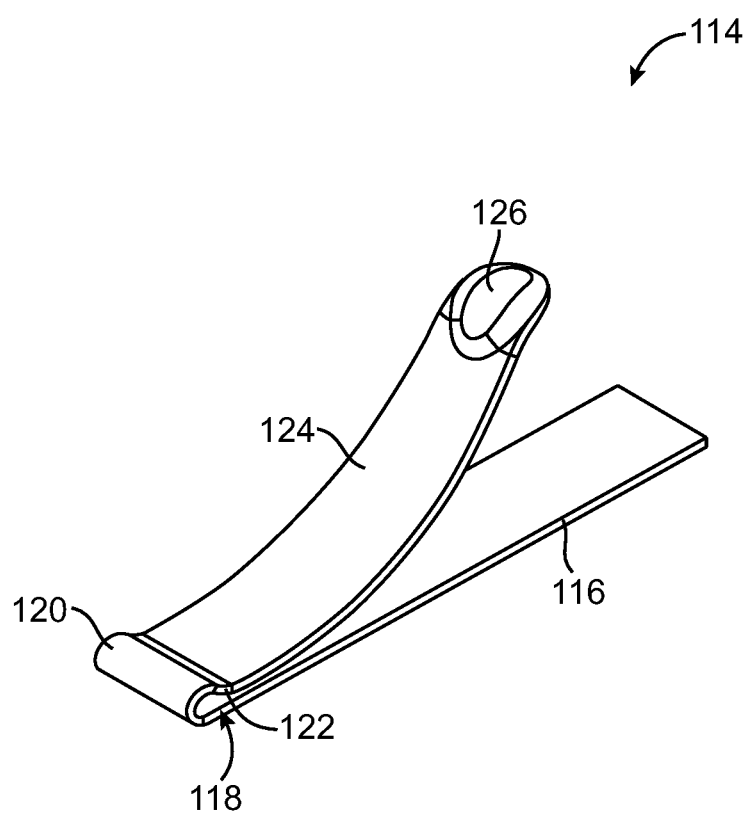
FIG. 14 is a perspective view of an illustrative compression spring that may be a part of a button mechanism in an electronic device in accordance with an embodiment of the present invention.

If desired, device 10 of FIG. 1 may include a compression spring that can be fully compressed without deforming. The compression spring may be part of a resilient button mechanism, as one example. In general, device 10 may include one or more compression springs. The compression springs may sometimes be referred to as variable cantilever compression springs. FIG. 14 illustrates one potential variable cantilever compression spring 114 that could be a part of device 10. Spring 114 may be formed from a single piece of metal with an elongated flat section 116, first curved portion 118, second curved portion 124, and contact member 126, as an example. Portions 124 and 116 may sometimes be referred to as curved structure 124 and elongated planar structure 116. Curved structure 124 may be coupled to elongated planar structure 116 at one of the ends of curved structure 124. First curved portion 118 may include two bends 120 and 122. With another suitable arrangement, curved section 124 may be directly connected to section 116 (e.g., curved section 118 may be removed). Portion 124 may have a relatively constant upward curvature over the majority of its length. If desired, spring 114 may be configured so that bends 120 and 122 in section 118 undergo substantially no elastic or plastic deformation when spring 114 is compressed.

With one suitable arrangement, spring 114 may be referred to as a variable cantilever spring because of its dynamic response to increasing compression. For example, the length of the cantilever of spring 114 (e.g., curved portion 124) may dynamically decrease as spring 114 is compressed. The length of the cantilever of spring 114 may be the distance between the contact region 126 and the closest point of contact between curved member 124 and structure 116. In this configuration, when spring 114 is relatively uncompressed, the length of the cantilever will essentially be the full length of member 124 and, when spring 1214 is partially compressed, the length of the cantilever will be reduced relative to the full length of member 124, thereby stiffening spring 114 as the spring is compressed. The length of the cantilever may be reduce by an amount proportional to the amount spring 114 is compressed. In contrast, the length of the cantilever of a conventional cantilevered spring is constant and does not change as the conventional spring is compressed.

Spring 114 may be relatively resistant to fatigue. As an example, the curved portion 118 of spring 114 typically experiences relatively high stress levels during the manufacture of spring 114 (e.g., because curved portion 118 may include the sharpest bends in spring 114) and experiences relatively low stress levels during normal use (e.g., compression and release of spring 114). In contrast, curved portion 124 typically experiences relatively low stress levels during manufacturing and experiences relatively high stress levels during normal use. This type of arrangement may increase the resistance of spring 114 to metal fatigue relative to conventional spring designs in which the sharpest bends are prone to breakage.

With one suitable arrangement, the elongated section 116 of spring 114 may be used as a first contact or attachment point to connect or attach spring 114 to a desired structure in device 10. Contact member 126 may be used a second contact or attachment point to connect or attach spring 114 to a desired structure in device 10. As spring 114 is compressed, contact member 126 may be depressed towards section 116 of spring 114. The point of contact between sections 116 and 124 of spring 114 may continually shift (e.g., progressively curve away from section 118) as spring 114 is compressed. For example, when spring 114 is in its natural state (e.g., no force is pressing member 126 towards section 116), the point of contact between sections 116 and 124 may be in region 122 of curved portion 124. As spring 114 is compressed, the point of contact between sections 116 and 124 may shift from section 118 towards member 126. The point of contact may shift continuously as spring 114 is compressed or may shift incrementally as spring 114 is compressed (e.g., curved section 124 may be formed from a plurality of straight sections with bends between them while maintaining the overall shape of the section 124 shown in FIG. 14). When spring 114 is completely compressed (e.g., member 126 is pressed directly against section 116), section 124 may lie relatively flat against 116. The arrangement of FIG. 14 helps to ensure that spring 114 does not undergo plastic deformation even when spring 114 is completely compressed.

Figure 15:
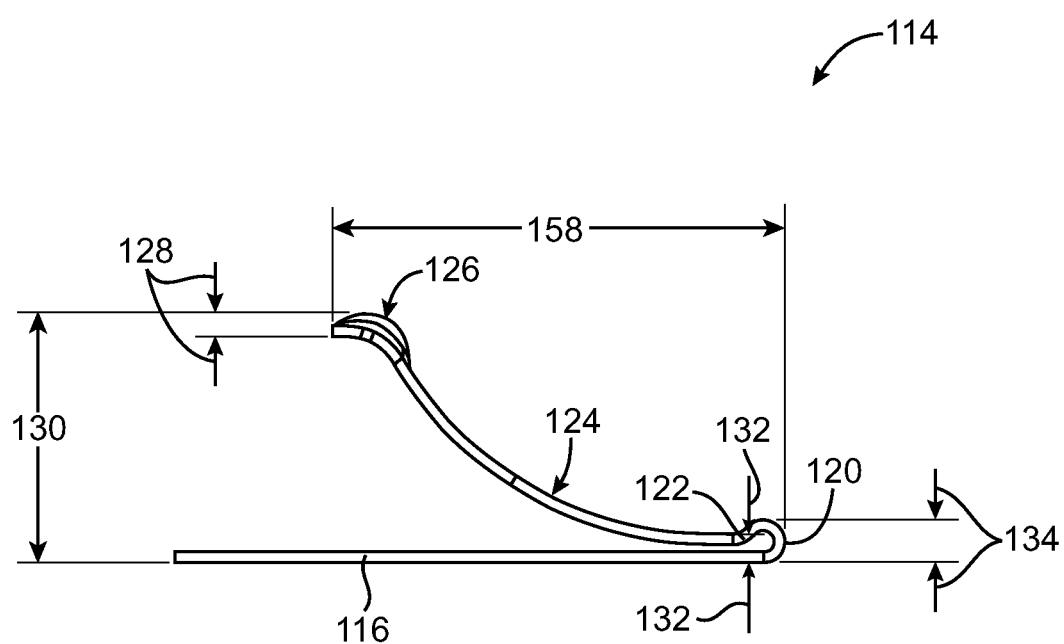
FIG. 15 is a side view of the illustrative compression spring of FIG. 14 that shows various dimensions of the compression spring in accordance with an embodiment of the present invention.

A side view of spring 114 is shown in FIG. 15. As shown in FIG. 15, spring 114 may have an uncompressed height of approximately 1.85 mm as indicated by arrows 130 (e.g., spring 114 may have an uncompressed height in the range of 1.50 mm to 2.00 mm). Contact member 126 may have a thickness of approximately 0.19 mm as indicated by arrows 128 (e.g., a thickness in the range of 0.1 mm to 0.5 mm). As one example, curve 124 may have a bend radius of approximately 2.75 mm when spring 114 is uncompressed (e.g., a bend radius in the range of 2.0 mm to 3.5 mm). Curved portion 118 may have a thickness of approximately 0.32 mm as indicated by arrows 134 (e.g., a thickness in the range of 0.1 mm to 0.5 mm). The second bend 122 of curved portion 118 may contact section 116 or, if desired, may be separated from section 116 by a gap of approximately 0.20 mm as indicated by arrows 132 (e.g., a gap in the range of 0.01 mm or less to 0.5 mm). Section 124 may have an uncompressed length (from curved portion 120 to contact member 126) of approximately 3.48 mm as indicated by arrows 158 (e.g., a length in the range of 2.5 mm to 5.0 mm).

Figure 16:
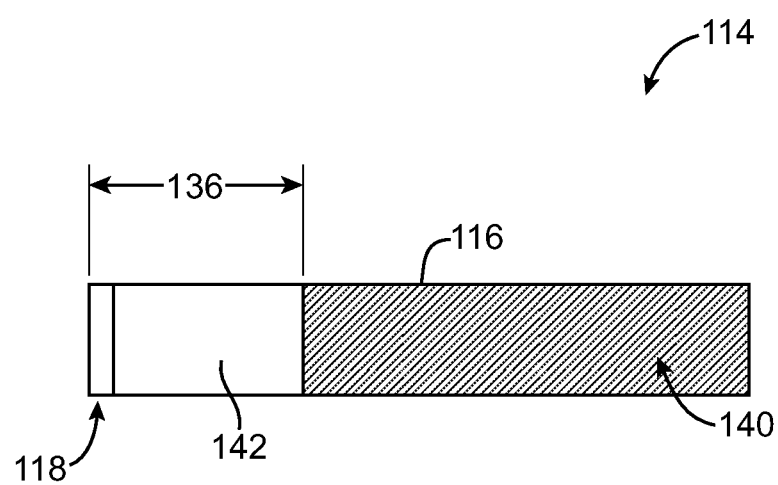
FIG. 16 is a bottom view of the illustrative compression spring of FIG. 14 showing a portion of the compression spring that may be used as an attachment point for mounting the compression spring in the electronic device in accordance with an embodiment of the present invention.

A bottom view of the variable cantilever spring 114 is shown in FIG. 16. As FIG. 16 illustrates, section 116 of spring 114 may include a contact patch 140 and a floating patch 142. The floating patch 142 of spring 114 may extend approximately 1.5 mm as indicated by arrows 136 from curved portion 118 towards contact patch 140. With one suitable arrangement, floating patch 142 may not be mounted to any other structure (e.g., patch 142 may freely flex as spring 114 is compressed). With this type of arrangement, spring 114 may be mounted in device 10 by securing contact patch 140 of spring 114 to a suitable mounting structure. As one example, patch 140 may be soldered to a mounting structure in device 10. In general, any suitable portion of spring 114 such as patch 140 or patch 142 (if desired) may be mounted to a structure in device 10 using any suitable means such as an adhesive, a tape, a mechanical fastener, by soldering, by another suitable means, or by a combination of these and other means.

Figure 17:
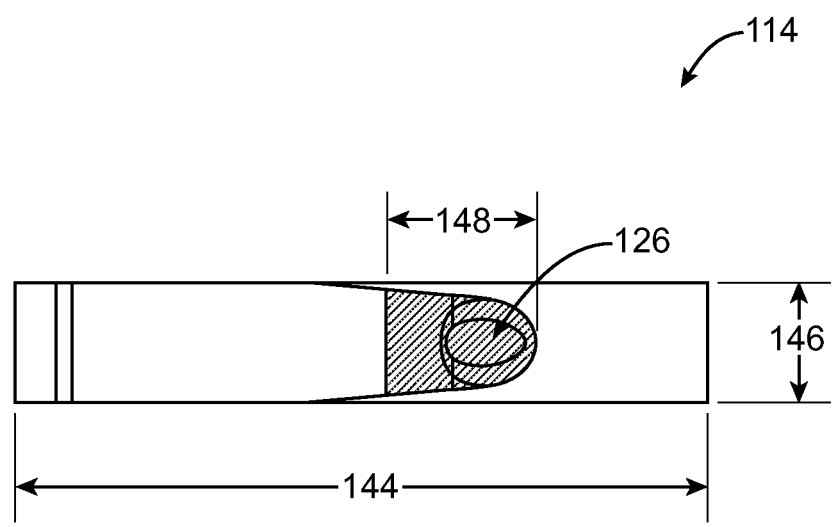
FIG. 17 is a top view of the illustrative compression spring of FIG. 14 that shows various dimensions of the compression spring in accordance with an embodiment of the present invention.

A top view of spring 114 is shown in FIG. 17. As shown in FIG. 17, contact portion 126 of spring 114 may include a contact area that is approximately 1.00 mm in length as indicated by arrows 148. With one suitable arrangement, contact portion 126 of spring 114 may extend across the shaded region of FIG. 17. With one suitable arrangement, spring 114 may have a width in the range of approximately 0.7 to 0.9 mm as illustrated by arrows 146 and may have a length of approximately 4.65 mm as illustrated by arrows 144.

Spring 114 may be formed from any suitable elastic material such as a spring metal. For example, spring 114 may be formed from steel, bronze, titanium, copper, other suitable elastic materials, or a combination of these and other suitable materials. With one suitable arrangement, spring 114 may be formed from a beryllium copper alloy with a thickness of approximately 0.08 mm and with a Vickers Pyramid Number (HV) in the range of approximately 300-340. If desired, spring 114 may be plated (e.g., to reduce contact resistance). As an example, some or the entire surface of spring 114 may be plated with gold (or other suitable material). With one suitable arrangement, contact portion 126 (e.g., the shaded region in FIG. 17) may be plated with gold with a plating thickness in the range of approximately 0.3 micrometers to 0.45 micrometers. Spring 114 may also include nickel plating between the gold plating and spring 114. For example, spring 114 may include a nickel plating sometimes referred to as a barrier layer with a thickness in the range of 1.0 to 1.5 micrometers. If desired, the nickel plating or barrier layer may extend over the entire surface of spring 114. In general, spring 114 may include any suitable combination of platings and barrier layers formed from any suitable materials. With one suitable arrangement, spring 114 may have a contact resistance (e.g., a resistance between an external member and spring 114 through contact region 126) of approximately 0.005 ohms with a contact force of approximately 0.3 newtons (N).

Figure 18:
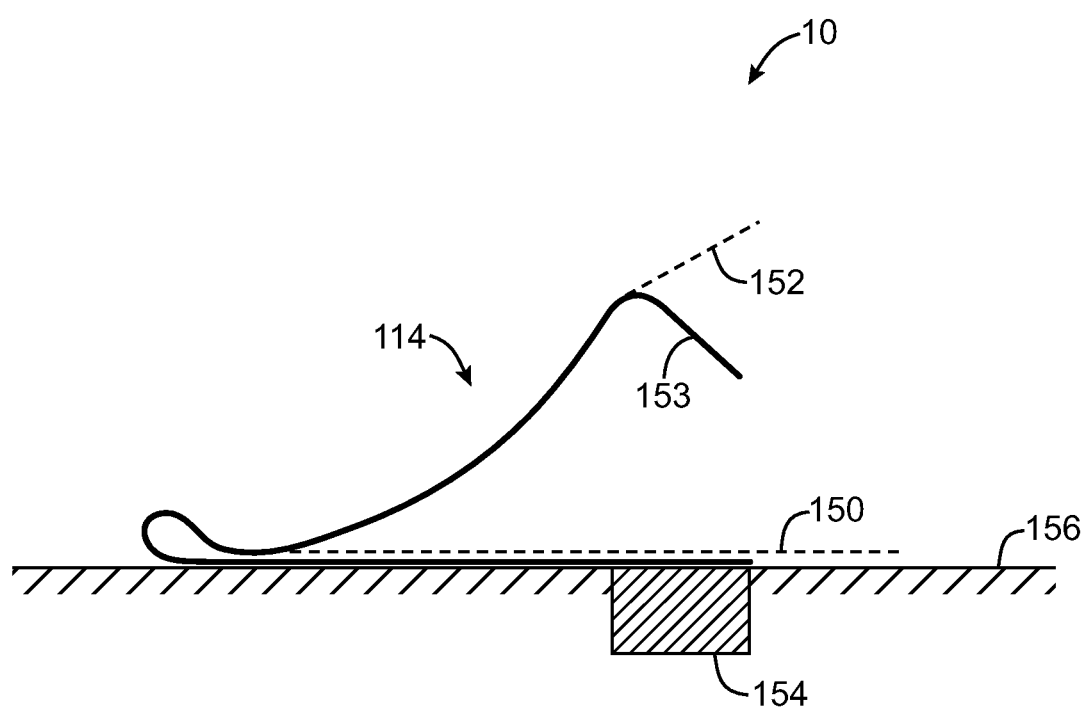
FIG. 18 is a cross-sectional side view of the illustrative compression spring of FIG. 14 mounted in an illustrative electronic device in accordance with an embodiment of the present invention.

If desired, spring 114 may include a structure which increases the uncompressed height of the spring following a nearly complete or complete compression of spring 114. For example, as shown in FIG. 18, the tip of spring 114 (e.g., the portion of spring 114 near contact patch 126) may be curved back towards the base of spring 114 (e.g., section 116 of spring 114) as illustrated by solid line 153 of FIG. 18. If spring 114 is compressed sufficiently (e.g., spring 114 is compressed to the position indicated by the dotted line 150), the tip of spring 114 may be bent away from the base of spring 114 (e.g., the tip of spring 114 may undergo plastic deformation). After the tip of spring 114 is bent away from the base of spring 114, the tip may rest in the position of dotted line 152 when the spring is uncompressed. This type of arrangement may be useful in increasing the uncompressed height of the spring following a relatively large compression. The resiliency of spring 114 may therefore be increased as a complete compression of spring 114 increases the distance that the spring 114 can be compressed.

If desired, spring 114 may be used to stiffen a mounting structure. Section 140 of spring 114 may be used to stiffen a mounting structure such as mounting structure 156. Mounting structure 156 may include any suitable structure such as a printed circuit board and a flex circuit. With this type of arrangement, a component 154 may be mounted to mounting structure 156 opposite spring 114. By utilizing spring 114 as a stiffener of mounting structure 156, component 154 may be mounted to a more flexible mounting structure 156 than would otherwise be practical (e.g., without having to add an addition stiffening structure, thereby reducing the number of components required). Component 154 may include any suitable component such as a flex circuit connector, processing circuitry, storage, input-output circuitry, etc.

Figure 19:
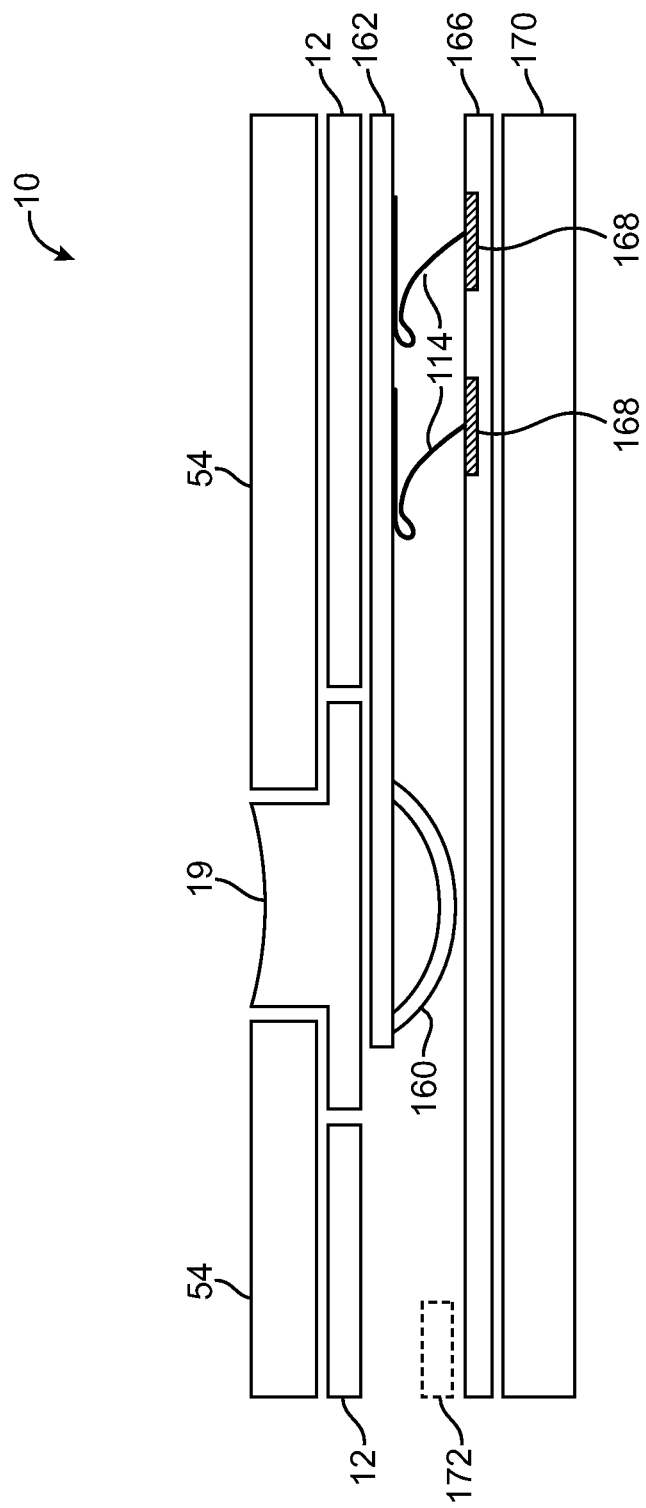
FIG. 19 is a cross-sectional side view of an illustrative electronic device with a button mechanism which includes a pair of compression springs in accordance with an embodiment of the present invention.

Device 10 may include one or more springs 114 as part of a button mechanism. As one example, device 10 may include two springs 114 that convey signals from a button such as button 19 between a pair of flex circuits as shown in FIG. 19. While the example of FIG. 19 shows the two springs 114 arranged at different distances from button 19, springs 114 may be arranged side-by-side (i.e., at similar distances from button 19), if desired.

The physical button 19 on the exterior surface of device 10 may be coupled to a switch mechanism 160 and a circuit board 162, as an example. Circuit 162 may be any suitable type of circuit such as a flex circuit or a printed circuit board. Switch mechanism 160 may be based on a dome switch mechanism or any other suitable button mechanism. With a dome switch mechanism, the dome of mechanism 160 will collapse when button 19 is pressed by a user. When the dome of mechanism 160 collapses it completes a circuit between two conductive lines. With one suitable arrangement, each of the two springs 114 in FIG. 19 may be coupled to a respective one of the two conductive lines through flex circuit 162. Each of the two springs 114 may also be coupled to a respective conductive line that is coupled to circuitry 172 through circuit 166 and contact patch 168. With this type of arrangement, when button 19 is pressed by a user and the dome switch mechanism 160 completes the circuit between the two conductive lines, a conductive loop may be formed that begins at circuitry 172, that passes through the two springs 114 and button mechanism 160, and ends at circuitry 172.

Contact patch 140 may be coupled to flex circuit 162. If desired, the contact patch 126 of each spring 114 may bear against contact region 168 of flex circuit 166. With one suitable arrangement, as one of the springs 114 is compressed, the contact patch 126 of the spring may slide along contact region 168 of circuit 166. Contact region 168 may be plated with a suitable material. As an example, contact region 168 of flex circuit 166 may be plated with gold.

Circuit 166 may be any suitable type of circuit such as a flex circuit or a printed circuit board and may be mounted on structure 170, as an example. Structure 170 may be a speaker enclosure or other suitable structure.

The foregoing is merely illustrative of the principles of this invention and various modifications can be made by those skilled in the art without departing from the scope and spirit of the invention.

What is claimed is:

1. An electronic device comprising:
    a transparent cover;
    a mask covering a portion of the transparent cover, wherein the mask comprises portions defining a plurality of holes;
    a given sensor mounted beneath the transparent cover and the plurality of holes in the mask; and
    a touchscreen display having touch sensors in an active region of the touchscreen display, wherein the given sensor is located in an inactive region of the touchscreen display, wherein the portions defining the plurality of holes in the mask are configured to allow light for the given sensor to pass through the holes in the mask while obscuring the given sensor from view, and wherein the transparent cover extends over the inactive region of the touchscreen display.

2. The electronic device defined in claim 1 wherein each of the plurality of holes has a center and is adjacent to at least one other hole in the plurality of holes and wherein the centers of adjacent holes are separated by a distance in the range of 100 micrometers to 300 micrometers.

3. The electronic device defined in claim 1 wherein the given sensor comprises an ambient light sensor that measures visible light that is received through the holes.

4. The electronic device defined in claim 1 wherein the given sensor comprises a proximity detector that detects the presence of an object when the object comes within a given distance of the electronic device.

5. The electronic device defined in claim 1 wherein the given sensor comprises an emitter and a receiver pair configured as a proximity detector and wherein the mask comprises portions defining a plurality of additional holes, the electronic device further comprising:
an ambient light sensor mounted beneath the transparent cover under the plurality of additional holes in the mask.

6. The electronic device defined in claim 1 wherein the mask comprises a metallic layer.

7. The electronic device defined in claim 1 wherein the mask comprises ink.

8. The electronic device defined in claim 1 further comprising:
a button that receives user input, wherein the transparent cover and the mask comprise portions defining a button hole and wherein the button extends at least partway into the button hole; and
a spring coupled to the button, wherein the spring has an elongated planar structure and has a curved structure coupled to the elongated planar structure at a given end of the curved structure, wherein the curved structure progressively curves away from the elongated planar structure along its length, wherein the curved structure is configured to provide resistance to a force compressing the curved structure towards the elongated planar structure, and wherein there is a point of contact between the curved structure and the elongated planar structure that shifts away from the given end of the curved structure as the curved structure is compressed towards the elongated planar structure.

9. The electronic device defined in claim 1, wherein the transparent cover extends over the touchscreen display.

10. An electronic device, comprising:
a display having a transparent cover with an active image area and an inactive peripheral region;
a light sensor under the inactive peripheral region; and
an opaque layer on the transparent cover in the inactive peripheral region, wherein the opaque layer comprises an array of holes through which light passes to the light sensor while the opaque layer obscures the light sensor from view.

11. The electronic device defined in claim 10 wherein the transparent cover comprises a glass cover and wherein the display comprises a touch screen display.

12. The electronic device defined in claim 10 wherein the opaque layer comprises a layer of metal.

13. The electronic device defined in claim 10 wherein the opaque layer comprises a layer of metal and wherein the holes each have a diameter of less than 0.5 mm.

14. The electronic device defined in claim 10 wherein each of the holes has a center and is adjacent to at least one other hole in the array of holes and wherein the centers of adjacent holes are separated by a distance in the range of 100 micrometers to 300 micrometers.

15. The electronic device defined in claim 10 wherein the light sensor comprises an ambient light sensor that measures visible light that is received through the holes.

16. The electronic device defined in claim 10 wherein the light sensor comprises a proximity detector that detects the presence of an object when the object comes within a given distance of the electronic device.

17. The electronic device defined in claim 10 wherein the light sensor comprises an ambient light sensor and wherein the opaque layer comprises portions defining a plurality of additional holes, the electronic device further comprising:
an emitter and receiver pair configured as a proximity detector, wherein the emitter and receiver pair are mounted beneath the transparent cover under the plurality of additional holes in the mask.

18. The electronic device defined in claim 10 wherein the opaque layer comprises ink.

19. The electronic device defined in claim 10 further comprising:
a button that receives user input, wherein the transparent cover and the opaque layer comprise portions defining a button hole and wherein the button extends at least partway into the button hole; and
a spring coupled to the button, wherein the spring has an elongated planar structure and has a curved structure coupled to the elongated planar structure at a given end of the curved structure, wherein the curved structure progressively curves away from the elongated planar structure along its length, wherein the curved structure is configured to provide resistance to a force compressing the curved structure towards the elongated planar structure, and wherein there is a point of contact between the curved structure and the elongated planar structure that shifts away from the given end of the curved structure as the curved structure is compressed towards the elongated planar structure.

20. The electronic device defined in claim 10 wherein the display comprises:
a light source;
a planar backing structure;
a chassis that holds the light source and the planar backing structure; and
an opaque seal that overlaps a gap between the chassis and the planar backing structure.

21. An electronic device, comprising:
a front surface;
a display on the front surface of the electronic device;
a transparent cover on the front surface of the electronic device, wherein the transparent cover extends over an inactive region of the display;
an opaque layer on the front surface of the electronic device and on the transparent cover; and
a sensor underneath the opaque layer, wherein the opaque layer comprises a plurality of holes through which radiation passes and wherein the plurality of holes are aligned with the sensor, wherein the sensor comprises an emitter and a receiver pair configured as a proximity detector, and wherein the plurality of holes in the opaque layer are configured to allow radiation for the sensor to pass through the holes in the opaque layer while obscuring the sensor from view.

22. The electronic device defined in claim 21 wherein each of the holes has a center and is adjacent to at least one other hole in the array of holes and wherein the centers of adjacent holes are separated by a distance in the range of 100 micrometers to 300 micrometers.

23. The electronic device defined in claim 21 wherein the display has an active image area and wherein the opaque layer substantially surrounds the active image area of the display.

* * * * *